United States Patent [19]

Imashiro et al.

[11] Patent Number: 5,659,213
[45] Date of Patent: Aug. 19, 1997

[54] SPINDLE MOTOR

[75] Inventors: Hideki Imashiro, Nishinomiya; Shuhei Takasu, Nishikyo-ku, both of Japan

[73] Assignee: Nidec Corporation, Kyoto, Japan

[21] Appl. No.: 339,766

[22] Filed: Nov. 15, 1994

[30] Foreign Application Priority Data

Feb. 28, 1994 [JP] Japan .................................. 6-055292

[51] Int. Cl.⁶ .................................................. G11B 33/02
[52] U.S. Cl. ...................... 310/71; 360/98.07; 360/99.08
[58] Field of Search ........................... 310/71; 360/98.07, 360/99.08

[56] References Cited

U.S. PATENT DOCUMENTS

| | | | |
|---|---|---|---|
| 4,851,725 | 7/1989 | Keck | 310/71 |
| 5,161,982 | 11/1992 | Mowry | 439/68 |
| 5,189,327 | 2/1993 | Ootsuka et al. | 310/71 |
| 5,444,315 | 8/1995 | Adam et al. | 310/71 |
| 5,541,787 | 7/1996 | Jabbari et al. | 360/97.01 |
| 5,545,939 | 8/1996 | Cooper | 310/71 |

*Primary Examiner*—Thomas M. Dougherty
*Attorney, Agent, or Firm*—McCormick, Paulding & Huber

[57] ABSTRACT

A spindle motor comprising a base main body, a stator, and a connector means to which a lead portion from a coil of the stator is electrically connected. A core securing portion and a core securing hole are provided in the base main body. The connector menas is provided with a block-shaped connector main body and a plurality of terminal portions disposed in the connector main body, one end portions of the plurality of the terminal portions are exposed to one surface of the connector main body and their other end portions are exposed to the other surface of the connector main body. The stator and the connector are constructed as a unit by connecting lead portions from coils to one end portions of the plurality of the terminal portions. A coil winding apparatus convenient for winding coils on stator cores and connecting one end portions of the coils to the terminal portions of the connector means.

7 Claims, 12 Drawing Sheets

SPINDLE MOTOR

FIELD OF THE INVENTION

This invention relates to a spindle motor for rotating and driving a recording disk, and a coil-winding apparatus for winding cores about stator cores of the motor.

DESCRIPTION OF THE PRIOR ART

A spindle motor of a conventional base-integral type, as is disclosed, for example, in U.S. Pat. No. 5,291,357, has a base main body, a stator mounted on the base main body, a hub rotatably supported by the base main body, and a rotor magnet secured to the hub. The stator has a stator core fixed to the base main body, and a coil is wound as required on the stator core. A flexible circuit substrate board is disposed on the lower surface of the base main body. A through-hole is formed in the base main body. The lead portion from the coil is conducted out of the motor through the through-hole, and the so conducted lead portion is connected electrically to the terminal portion of the flexible circuit substrate board by such means as soldering.

However, this type of spindle motor has the following problems to be solved. To connect the lead portion of the coil to the circuit substrate board, it is first necessary to conduct the lead portion outwardly through the through-hole of the base main body and then to connect the forward end portion of the lead portion to the circuit substrate board. Accordingly, the operation for connection is complex. Furthermore, the operation is time-consuming and it is difficult to automate the assembling.

SUMMARY OF THE INVENTION

A first object of this invention is to provide a spindle motor in which a lead portion of a coil of a stator is easily connected electrically to a terminal portion of a circuit substrate board.

A second object of this invention is to provide a spindle motor in which a connector means to be connected electrically to the circuit substrate board can be secured easily and simply to the base main body.

A third object of this invention is to provide a spindle motor in which the connector means can be made small-sized.

A fourth object of this invention is to provide a coil-winding apparatus in which a coil is wound as required to the stator core of the motor and the end portion of a wound coil can be electrically connected to the connector means.

A fifth object of this invention is to provide a coil-winding apparatus in which the stator core and the connector means can be easily secured, or removed.

The other objects and characteristics of the present invention will be easily understood from the following description.

2

DETAILED DESCRIPTION OF THE PREFERRED EMBODIMENTS

Now, with reference to the accompanying drawings, the invention will be described in detail.

Figure 1:
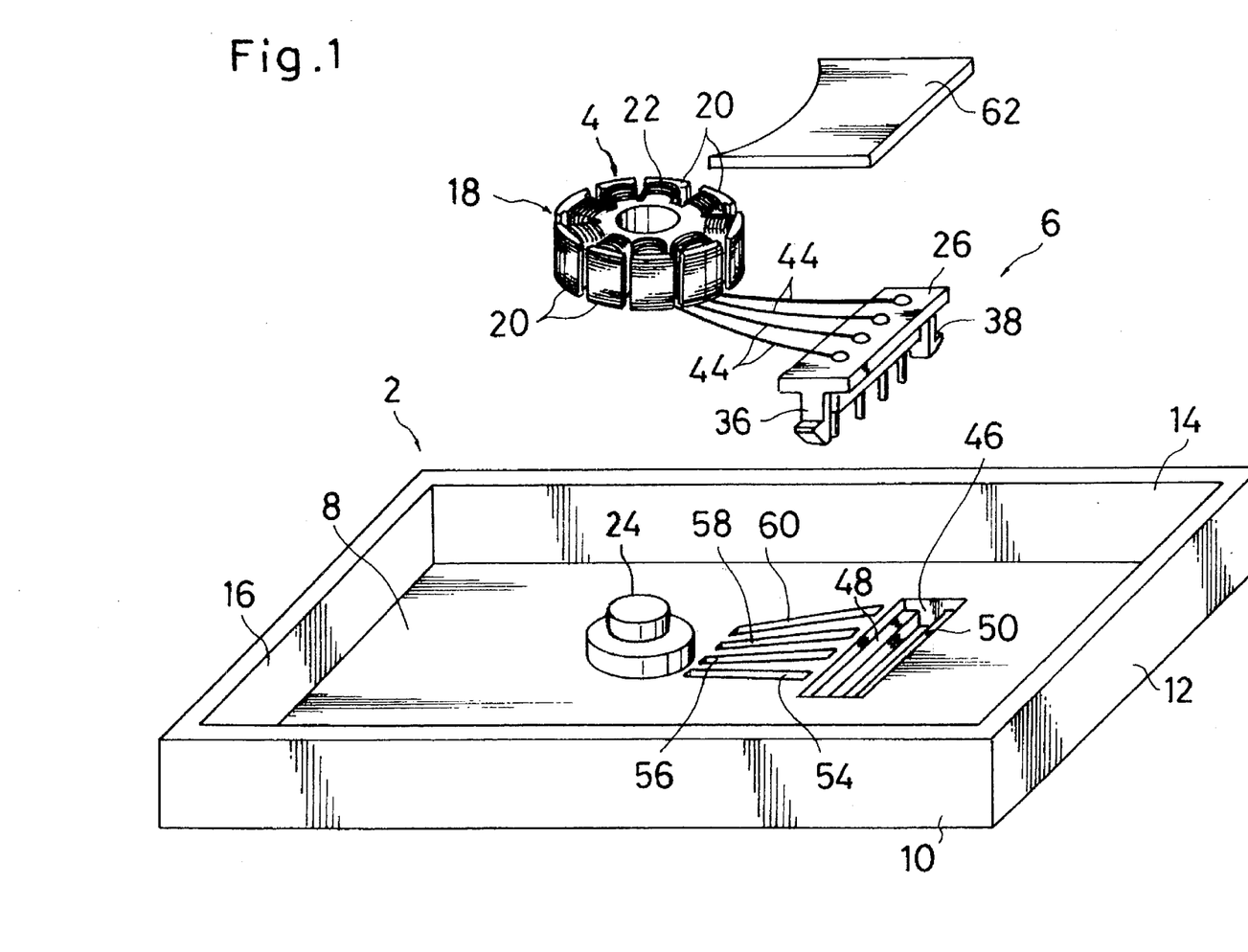
FIG. 1 is a fragmentary perspective view which shows a part of an essential portion in fragment of a first embodiment of the spindle motor in accordance with this invention.
Figure 2:
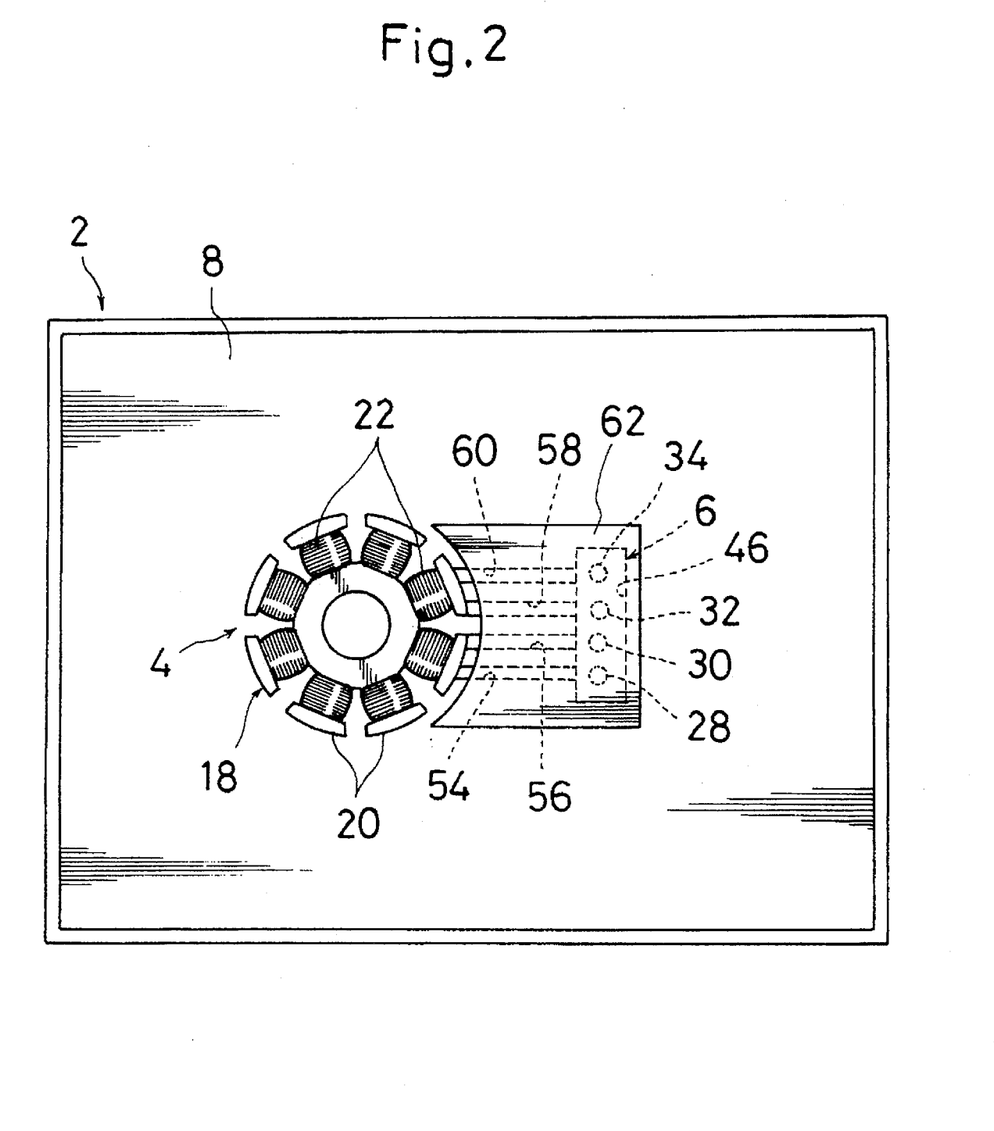
FIG. 2 is a top plan view of an essential portion of the spindle motor of FIG. 1.

With reference to FIGS. 1 and 2, the depicted spindle motor is provided with a base main body 2, a stator 4 to be mounted on the base main body 2 and connector means 6 connected to the stator 4. The base main body 2 is nearly rectangular and has a bottom wall 8, and side walls 10, 12, 14 and 16 extending upwardly from the four side edges of the bottom wall 8. A cover member (not shown) is mounted on the base main body 2, and in cooperation with the cover member, the main body 2 defines a disk chamber.

The stator 4 and a rotor hub (not shown) rotatable with respect to the stator 4 are disposed in the disk chamber. The stator 4 has a stator core 18 formed by laminating a plurality of core plates. A plurality of teeth 20 are provided at circumfrentially spaced intervals in the stator core 18. Coils 22 are wound as required about these teeth 20. An inwardly projecting wall 24 is provided in the bottom wall 8 of the base main portion 2, and the stator core 18 is mounted on the projecting wall 24.

Although not shown in the drawings, the rotor hub is rotatably supported by the projecting wall 24 via a bearing means, and a rotor magnet is secured in opposition to the stator 4. A recording disk such as a magnetic disk is secured to the rotor hub.

Figure 3:
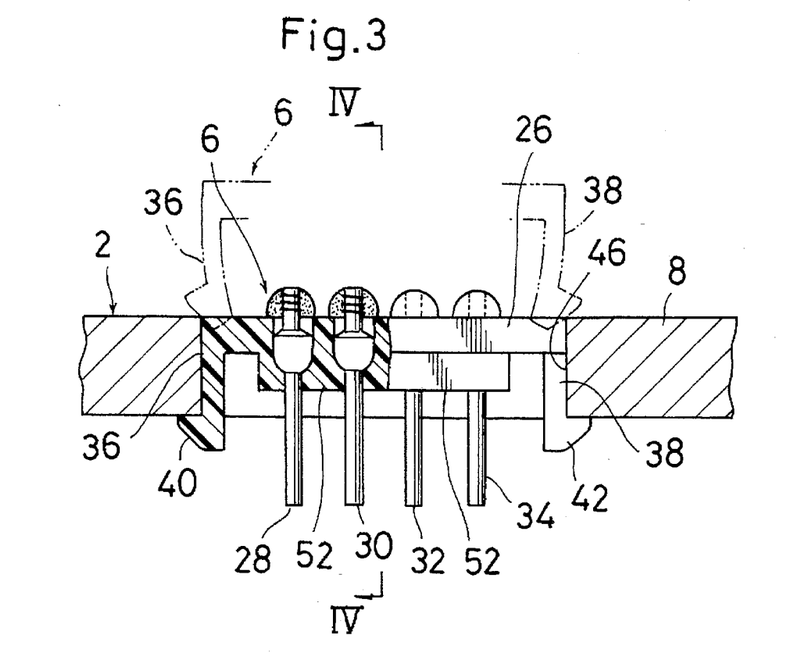
FIG. 3 is a partial sectional view of the connector means and their neighborhood in the spindle motor in FIG. 1.
Figure 4:
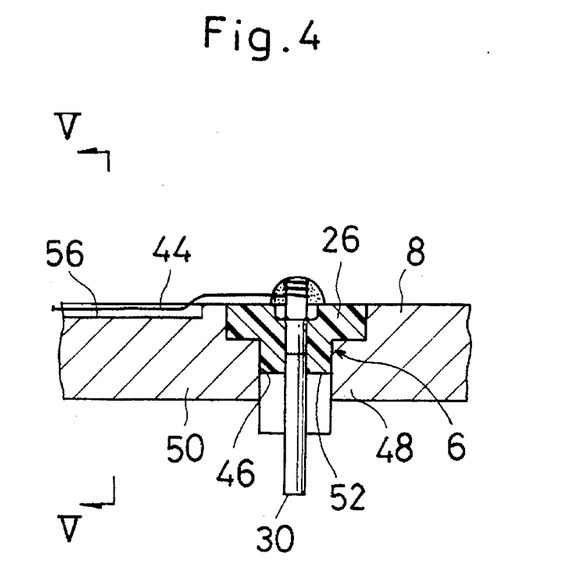
FIG. 4 is a sectional view on line IV—IV in FIG. 3.

The connector means o has a connector main body 26. With reference to FIGS. 3 and 4, the connector main body 26 depicted is a block-shaped. In this connector main body 26, four terminal portions 28, 30, 32 and 34 are provided at intervals longitudinally (in FIG. 1, in the right upper direction from the left bottom; in FIG. 2, in the upward and downward direction; in FIG. 3, the left and right direction; and in FIG. 4, in a direction perpendicular to the sheet surface). One end portions of the terminal portions 28, 30, 32 and 34 project upwardly from one surface (upper surface) of the connector main body 26, and their other surface terminal portions project downwardly from the other surface (lower surface) of the connector main body 26. The connector main body 26 can be formed, for example, by integral molding of a synthetic resin. A pair of elastically engaged pieces 36 and 38 are provided in its both end portions. The pair of elastically engaged pieces 36 and 38 extend downwardly, and outwardly projecting nail portions 40 and 42 are provided in its forward end portion.

Lead portions 44 from the coil 22 of the stator 4 are connected to the terminal portions 28, 30, 32 and 34 of the connector means 6. The depicted spindle motor may be a three-phase motor, for example, a coil in a U phase is electrically connected to the terminal portion 28; a coil in a V phase, to the terminal portion 30; a coil in a W phase, to the terminal portion 32; and a common line, to the terminal portion 34. The manner of connecting the coil 22 will be described below.

The connector means 6 will be mounted onto a connector securing hole 46 formed in the base main body 2. A rectangular securing hole 46 is formed at predetermined intervals from the projecting wall 24 in the bottom wall 8 of the base main body 2. Supporting projecting portions 48 and 50 projecting inwardly are provided on both side portions of the securing hole 46. The connector main body 26 is mounted onto the connector securing hole 46 from upwardly. When it is so mounted, the connector main body 26 is accommodated in the securing hole 46, and both side portions of the connector main body 26 are supported by supporting projecting portions 48 and 50. The elastically engaged pieces 36 and 38 which are somewhat elastically deformable are projected downwardly through the securing hole 46, and the nail portions 40 and 42 are respectively engaged with the lower surface of the bottom wall 8 of the base main body 2. In the specific example, it is easily understood from FIGS. 3 and 4 that a reinforcing projecting portion 52 is provided in a greater region of the other surface of the connector main body 26, and the other end portions of the terminal portions 28, 30, 32, and 34 project from this refinforcing projecting portion 52.

Figure 5:
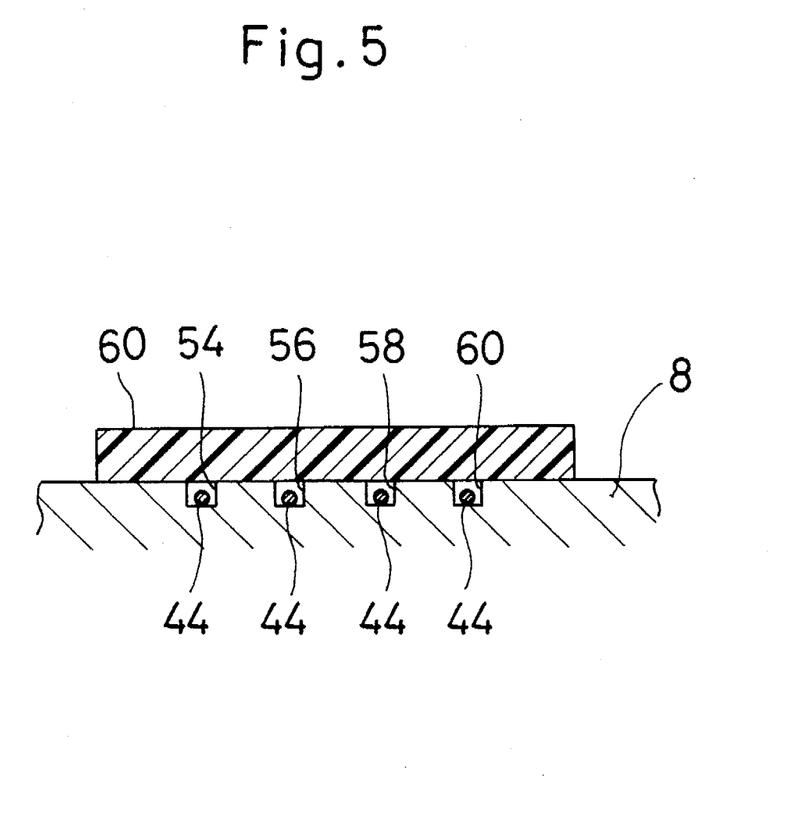
FIG. 5 is a sectional view on line V—V in FIG. 4.

In the specific example, accommodating grooves 54, 56, 58 and 60 extending in a straight line from the projecting wall 24 (in other words, the stator 4) toward the securing hole 46 are provided in the inner surface of the bottom wall 8 of the base main body 2. As clearly shown in FIGS. 2 and 5, the lead portion 44 from the coil of the U phase is accommodated, for example, in the accommodating groove 54; the lead portion 44 from the coil in the V phase is accommodated in the accommodating groove 56; the lead portion 44 from the coil in the W phase is accommodated in the accommodating groove 58; and the common line as the lead portion is accommodated in the accommodating groove 60.

The accommodating grooves 54, 56, 58 and 60 and the securing hole 46 are sealed by a sealing member 62. The sealing member 62 may be constructed of a sheet of a synthetic resin, and can cover the accommodating grooves 54, 56, 58 and 60, the securing hole 46, and the connector means 6 mounted thereon. Accordingly, the securing hole 46 is sealed up by the sealing member 62 and the rising of the lead portions 44 accommodated by the accommodating grooves 54, 56, 58 and 60 is prevented. When the lead portions 44 from the coil 22 are arranged along the surface of the base main body 2, it is preferred to provide an insulation film on its surface (the inner surface of the bottom wall 8 in the specific embodiment).

In the specific example, the sealing member 62 covers the accommodating grooves 54, 56, 58 and 60 and the securing hole 46. Instead of this, the securing hole 46 may be sealed with the sealing member, and the lead portions 44 may be fixed with, for example, a tape. The lead portions 44 from the coil 22 are accommodated in the corresponding accommodating grooves 54, 56, 58 and 60. But these lead portions 44 may be accommodated in a single accommodating groove.

A circuit substrate board (not shown) of the disk driving apparatus is disposed in the underside of the bottom wall 8 of the base main body 2. A connector is provided in the circuit substrate board although it is not shown. when the circuit substrate board is mounted on the base main body 2, the terminal portions 28, 30, 32 and 34 on the connector means 6 of the base main body 2 are connected electrically to the connector of the circuit substrate board, and thus an electric current from the circuit substrate board is supplied to the coil 22 of the stator 4 through the connector means 6.

Figure 6:
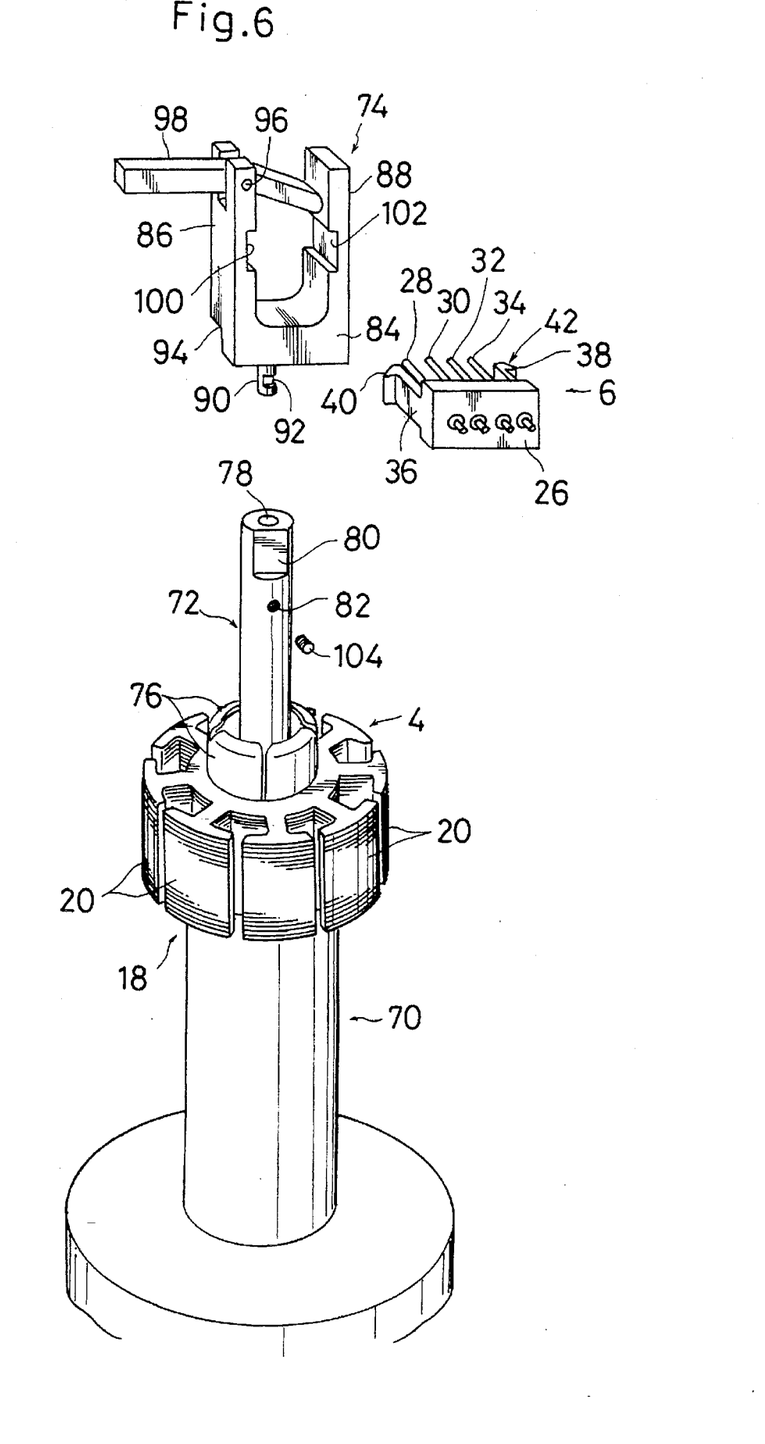
FIG. 6 is a fragmentary perspective view which partly shows a principal portion in fragment of a first embodiment of the coil-winding apparatus in accordance with the present invention.

Now, the coil-winding apparatus for winding the coil 22 as desired on the stator core 18 will be illustrated. With reference to FIG. 6, the illustrated coil-winding apparatus has a main holding shaft 70, a subsidiary holding shaft 72, and a clamp means 74. The main holding shaft 70 is hollow cylindrical, and four slits are formed circumferentially in its forward end portion. These slits form the holding piece 76. It is easily understood that the holding piece 76 may be radially elastically deformable about its basal portion as a center. The stator core 18 is mounted on the holding piece 76 of the main holding piece 70. The stator core 18 is mounted on the outer circumferential surfaces of the four holding pieces 76 which are approximately circular on the whole, and is held elastically by elastically deforming the holding pieces 76 somewhat inwardly. The main holding shaft 70 is supported rotatably, and is revolved over a predetermined angular range by a driving source (not shown) such as a motor.

The subsidiary shaft 72 is disposed stationarily inwardly of the main holding shaft 70. The forward end portion of this subsidiary holding shaft 72 projects upwardly from the forward end portion of the main holding shaft 70, and an axially extending securing hole 78 is provided in its forward end surface. At a forward end portion of the subsidiary holding shaft 72, and abutting surface 80 is provided by cutting a portion thereof. Furthermore, a female screw hole 82 is provided underneath the abutting surface 80.

The clamp means 74 has a main body portion 84. Holding projections 86 and 88 are provided integrally on both end portions of the main body portion 84. Furthermore, a downwardly extending fixing shaft 90 is provided centrally in the main body portion 84, and a notched concave portion 92 is formed in the forward end portion of the fixing shaft 90. By notching the under portion of the main body portion 84 in an approximately L-shape, an abutting surface 94 is defined.

One of the pair of the holding projections 86 and 88, namely the forward end portion of the holding projection 86 in the specified example, a rectangular concave portion is formed, and a swivelling lever 98 is mounted rotatably on the concave portion via a pin 96. The clamp means 74 may be formed from, for example, a synthetic resin so that the pair of holding projections 86 and 88 may be somewhat elastically deform able in directions approaching to each other or separated from each other. When the swivelling lever 98 is rotated so that the forward end portion acts on the holding projection 88, the holding projection 88 supports the base portion as a supporting point, and somewhat elastically deforms in a direction apart from the holding projection 86. The space between the holding projections 86 and 88 becomes somewhat large. On the other hand, when the forward end portion of the swivelling lever 98 departs from the other holding projection 88, the holding projection 88 returns to the original state, and thus, the space between the pair of holding projections 86 and 88 somewhat decreases. Furthermore, holding grooves 100 and 102 extending in the mounting direction (in a direction of right bottom to left upper in FIG. 6, and a perpendicular direction with respect to the sheet surface in FIG. 7) of the connector means 6 are formed in the inner surfaces of the pair of holding projections 86 and 88. The width of the holding grooves 100 and 102 is substantially equal to the width of the elastic engaging pieces 36 and 38 of the connector means 6, and the elastic engaging pieces 36 and 38 are held by the holding grooves 100 and 102 of the holding projections 86 and 88.

The clamp means 74 is secured to the subsidiary holding shaft 72 in the following manner. First, the fixing shaft 90 of the clamp means 74 is inserted into the securing hole 78 of the subsidiary holding shaft 72. When it is so inserted, the lower surface of the main body portion 84 abuts with the forward end surface of the subsidiary holding shaft 72, and the clamp means 74 is held in a predetermined position with respect to the subsidiary holding shaft 72. Furthermore, the abutting surface 94 defined in the main body portion 84 abuts with the abutting surface 80 of the subsidiary holding shaft 72, and the relative rotation of the clamp means 74 with respect to the subsidiary holding shaft 72 is hampered. Then, a fixing screw 104 is screwed into a female screw 82, and its forward end portion was caused to act on the notching concave portion 92 of the fixing shaft 90. The clamp means 74 is surely fixed by the subsidiary holding shaft 72 by the fixing screw 104.

Figure 7:
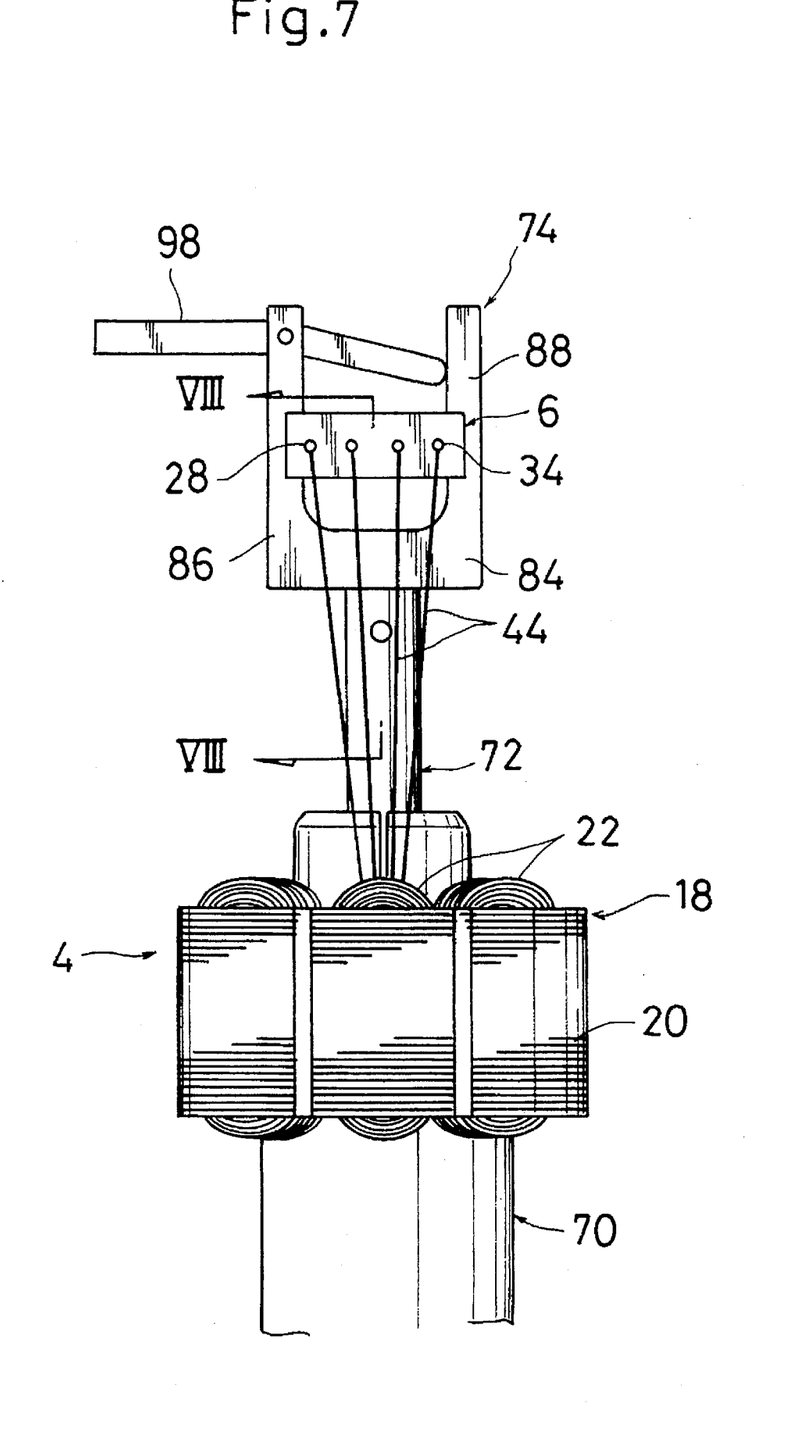
FIG. 7 is a front view showing a part of the coil-winding apparatus of FIG. 6.
Figure 8:
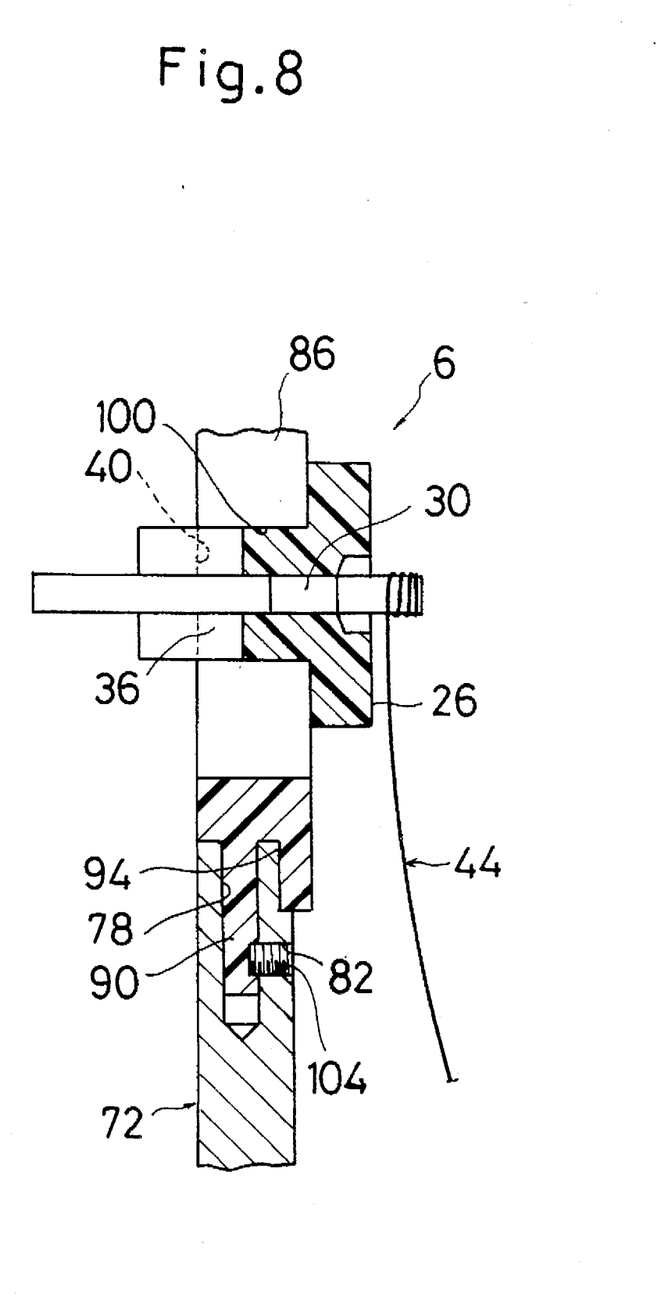
FIG. 8 is a sectional view taken along line VIII—VIII of FIG. 7.

Now, with reference to FIGS. 6, 7 and 8, the manner of winding the coil 22 will be explained. To wind the coil 22, the stator core 18 is first mounted on the main holding shaft 70, and the connector means 6 is secured to the clamp means 74. To mount the stator core 18, the stator core 18 may be fitted outwardly of the holding piece 76 of the main holding shaft 70. When so mounted, the four holding pieces 76 are elastically deformed somewhat radially inwardly. Thus, as shown in FIGS. 6 and 7, the stator core 18 is elastically held on the holding pieces 76. To secure the connector means 6, the connector means 6 may be positioned between the pair of the holding projections 86 and 88. The elastic engaging pieces 36 and 38 of the connector means 6 are positioned in the holding grooves 100 and 102, and inserted in the mounting direction from one side. When so inserted, the elastic engaging pieces 100 and 102 are somewhat elastically deformed inwardly, and the holding projections 86 and 88 are somewhat elastically deformed in a direction in which they depart from each other. Thus, the mounting of the connector means 6 on the clamp means 74 is performed. When so mounted, it is understood from FIG. 8 that both end portions of the connector main body 26 abut with one surface (the right surface in FIG. 8) of the holding projections 86 and 88, and furthermore, the nail portions 40 and 42 of the elastic engaging pieces 36 and 38 project toward the other side through the holding projections 86 and 88 and are engaged with the other surface of the holding projections 86 and 88. Thus, the connector member 6 is elastically held between the pair of the holding projections 86 and 88.

In the winding of the coil 22, the stator core 18 is positioned at a predetermined angular position. This positioning is achieved by revolving the main holding shaft 70 at a predetermined angle. A specified tooth 20 (the tooth on which the coil 22 is wound) of the stator core 18 with respect to a needle (not shown) of the winding apparatus is held in a predetermined positional relation. The coil 22 to be wound is delivered from the needle, and thus, the coil 22 of the specified tooth 20 is wound as required. When the winding of the coil 22 on the specified tooth 20 is terminated, the main holding shaft 70 is angularly rotated, then the tooth 20 to be wound is held at a predetermined positional relation with respect to the needle (not shown), and the winding of the coil 22 onto the tooth 20 is carried out.

When the winding operation of the coil 22 in one phase is terminated, the end portion of the coil 22, namely the lead portion 44 from the coil 22, is bound on one end portion of the terminal portion 28 (or 30, 32 or 34) of the connector means 6 and as required, is fixed by such means as soldering. The binding operation of the lead portion 44 may preferably be carried out automatically together with the winding operation of the coil 22.

When the winding operation and the binding operation are over, the stator core 18 may be liberated from the main holding shaft 70, and the connector means 6 may be removed from the clamp means 74. To liberate the stator core 18 from the main holding shaft 70, the stator core 18 may be held and lifted upwardly. Accordingly, the holding piece 76 is somewhat elastically deformed radially inwardly, and thus, the stator core 18 can be easily liberated. It is easily unhderstood from FIGS. 6 and 7 that when the stator core 18 is relatively large and the connector means 6 is relatively small, the stator core 18 may be removed from the winding apparatus through the subsidiary holding shaft 72 and the clamp means 74 by only carrying the stator core 18 upwardly. To disengage the connector means 6, the swivelling lever 98 may be depressed downwardly. When such revolution is performed, the forward end portion of the swivelling lever 98 acts on the other holding projection 88, and the space between the pair of the holding projections 86 and 88 is somewhat broadened to produce a condition in which separation becomes possible. In such a condition, the connector means 6 is carried and moved in an opposite direction from the mounting direction whereby the elastic engaging pieces 36 and 38 are separated from the holding grooves 100 and 102 of the holding projections 86 and 88.

Figure 9:
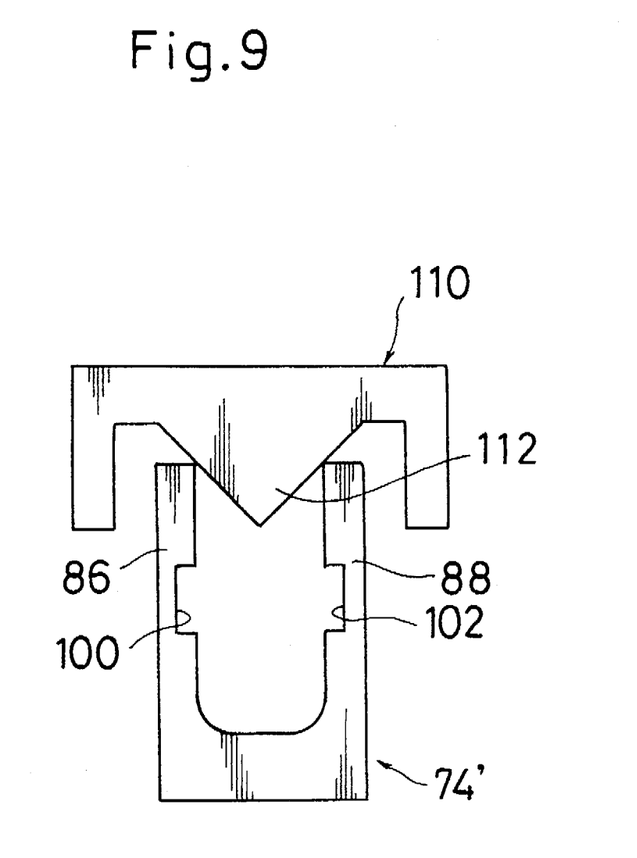
FIG. 9 is a partial view showing a part of a modified embodiment of the coil-winding apparatus of FIG. 6.

In the specific example, the space between the pair of the holding projections 86 and 88 is somewhat broadened by utilizing the swivelling lever 98. Instead of this, the clamp means may be constructed as shown in FIG. 9. In FIG. 9, the clamp means 74' in the modified example is provided with a wedge member shown by a reference numeral 110. The wedge member 110 is supported so that it may move freely upwardly and downwardly or it may swivel freely upwardly and downwardly. A nearly triangular wedge portion 112 is provided in the forward end portion of the wedge member 110. This wedge portion 112 is provided so that it may go between a pair of holding projection 110. The construction of the other portions of the modified example may be substantially the same as the clamp means shown in FIGS. 6 to 8.

In this modified example, when the wedge member 110 moves downwardly and acts on the pair of the holding projections 86 and 88, the space between the pair of the holding projections 86 and 88 is somewhat broadened to permit liberation of the clamp means 74' from the connector means. On the other hand, when the wedge member 110 moves upwardly and is separated from the pair of the holding projections 86 and 88, the holding projections 86 and 88 return to the original condition. The space between the holding projections 86 and 88 becomes somewhat smaller and the connector means 6 can be held between the holding projections 86 and 88.

Next, with reference to FIGS. 10 to 15, the second specific example of the spindle motor will be explained. In the second specific example of the spindle motor, the base main body and the connector means are improved.

Figure 10:
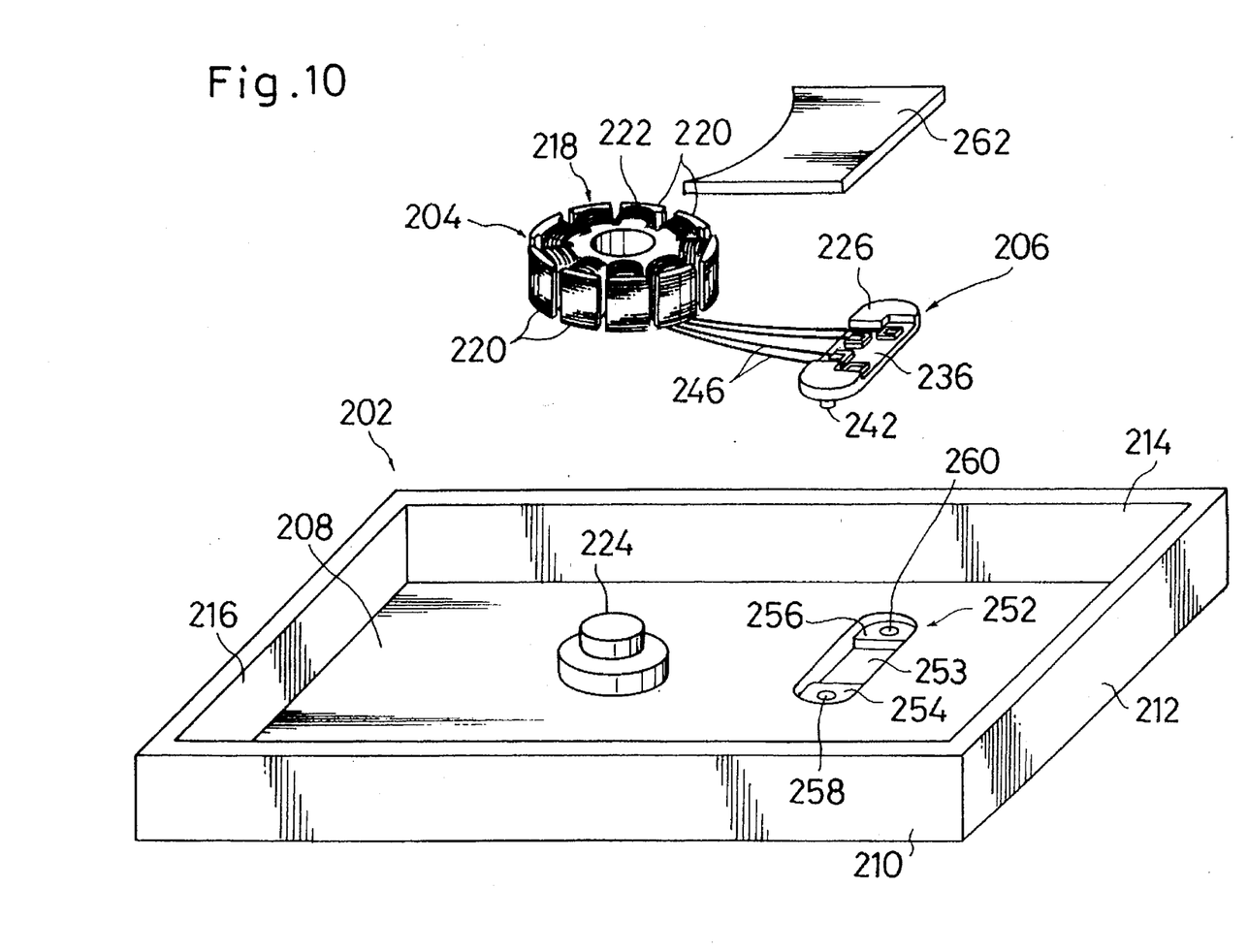
FIG. 10 is a fragmentary perspective view showing an essential portion in fragment of a second embodiment of the spindle motor in accordance with this invention.
Figure 11:
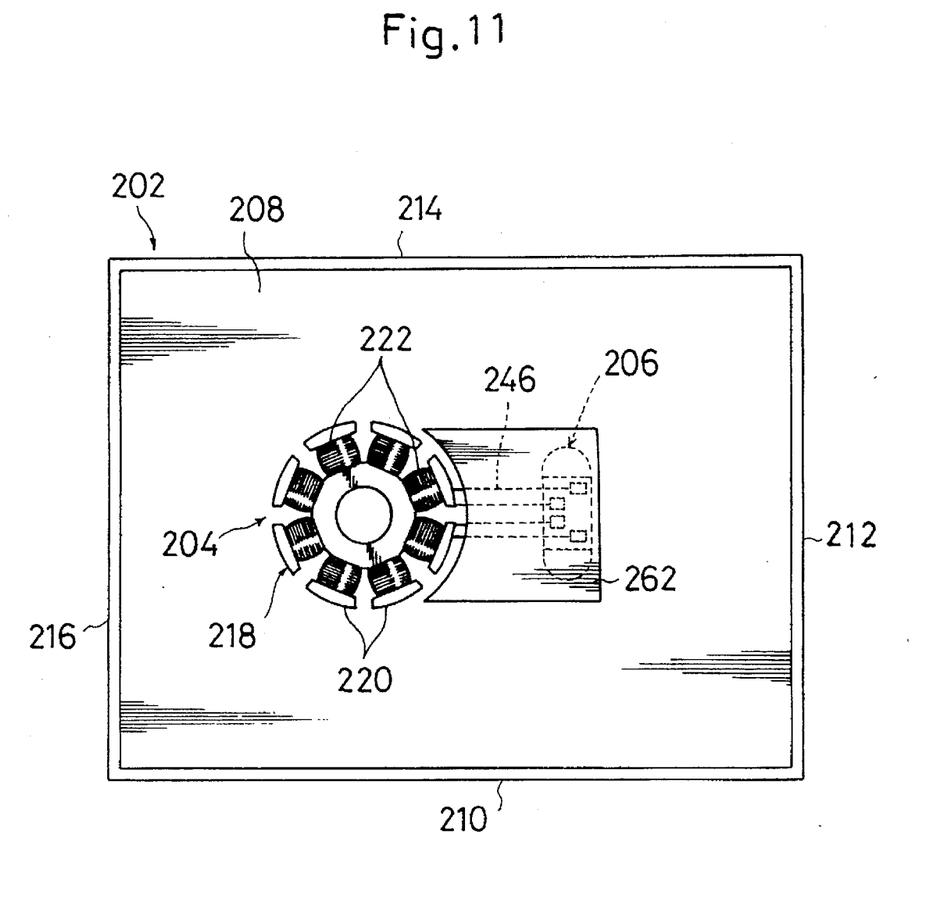
FIG. 11 is a plan view showing partly an essential portion of the spindle motor of FIG. 10.
Figure 12:
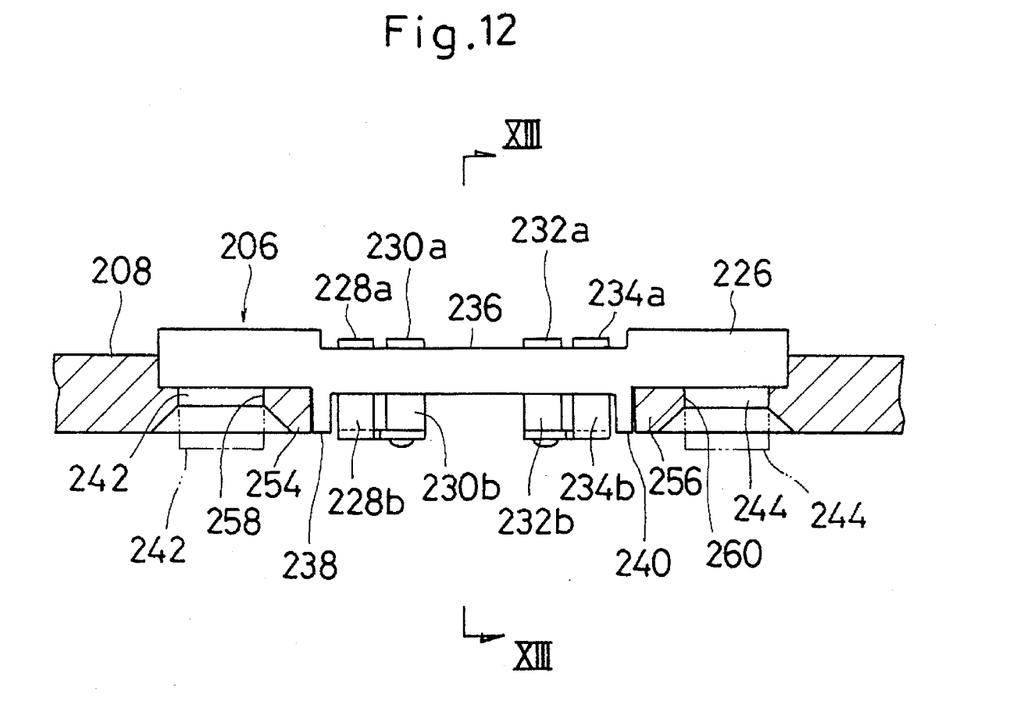
FIG. 12 is a partial sectional view showing the connector means and their neighborhood in the spindle motor of FIG. 10.

In FIGS. 10 and 11, the depicted spindle motor has a base main body 202, a stator 204, and a connector means 206 connected to the stator 204. The base main body 202 is nearly rectangular, and is provided with a bottom wall 208, and four side walls 210, 212, 214 and 216.

The stator 204 has a stator core 218, and a coil 222 is wound as required on a tooth 220 of the stator core 218. This stator core 218 is mounted on a projecting wall 224 provided in a bottom wall 208.

The connector means 206 has a connector main body 226. With reference to FIGS. 12 to 15 also, the connector main body 226 is plate-like. Four terminal portions 228, 230, 232 and 234 are provided in the connector main body 226. One end portions 228a, 230a, 232a and 234a of the terminal portions 228, 230, 232 and 234 are exposed on one surface (upper surface) of the connector main body 226, and their other end portions 228b, 230b, 232b and 234b are projected from the other surface (lower surface) of the connector main body 226. The connector main body 226 may be formed by integral molding of a synthetic resin, for example. In this specific example, a concave portion 236 is provided in the intermediate part of one surface of the connector main body 226, and one end portions 228a, 230a, 232a and 234a of the terminal portions 228, 230, 232 and 234 are disposed in the concave portion 236. Furthermore, a pair of abutting walls 238 and 240 are provided at intervals on the other surface of the connector main body 226, and the other end portions 228b, 230b, 232b and 234b of the terminal portions 228, 230, 232 and 234 are arranged between the pair of the abutting walls 238 and 240. Furthermore, a pair of projections 242 and 244 are provided in the other surface of the connector main body 226. The projections 242 and 244 are cylindrical in shape, and are provided outwardly of the abutting walls 238 and 240.

Lead portions 246 from the coil 222 of the stator 204 are connected to the terminal portions 228a, 230a, 232a and 234a of the connector means 206. The depicted spindle motor may be a motor having three phases, for example the coil in a U phase may be electrically connected to the terminal portion 228a; the coil in a V phase, to the terminal portion 230a; the coil in a W phase, to the terminal portion 232a; and a common line, to the terminal portion 234a. The terminal portions 228a, 230a, 232a and 234a are bent to the rearward and inward side to which the lead portion 246 are connected (in FIG. 14, one end portions 228a and 234a of the terminal portions 228 and 234 positioned upwardly being downwardly; and in FIG. 14, one end portions 230a and 232a of the terminal portions 230 and 232 positioned downwardly being upwardly). These terminal portions 228, 230, 232 and 234 are positioned inside the concave portion 236, and do not substantially project from one surface of the connector main body 226. In order to surely prevent the projection of the terminal portions 228, 230, 232 and 234, an accommodating concave portion 250 for accommodating its forward end portion of one end portions 228a, 230a, 232a and 234a may preferably be provided correspondingly to the individual terminal portions.

The connector means 206 is mounted on a connector securing position 252 formed in the base main body 202. In the bottom wall 208 of the base main body 202, a securing hole 253 forming a securing portion 252 is provided at a predetermined interval from the projecting wall 224. This securing hole 253 corresponds to the shape of the connector main body 226, and nearly hemispherical supporting portions 254 and 256 are provided in its both end portions (in FIG. 12, both end portions on the left and right directions). Pin holes 258 and 260 for receiving the projections 242 and 244 of the connector main body 226 are formed in the supporting portions 254 and 256. When the connector main body 226 is mounted on the connector securing portion 252, the connector main body 226 is positioned inside the securing hole 253. Its both end portions are placed on the supporting portions 254 and 256, and the other end portions 228b, 230b, 232b and 234b of the terminal portions 228, 230, 232 and 234 project outwardly through the securing hole 253.

The forward end portions of the projections 242 and 244 of the connector main body 226 are mounted on the base main body 202, thereafter, are thermally melted, and are fixed to the base main body 202 by thermal melting deformation. Mainly with reference to FIG. 12, when the connector main body 226 is placed on the supporting portions 254 and 256 of the connector securing portion 252, the projections 242 and 244 project somewhat downwardly through the pin holes 258 and 260 of the supporting portions 254 and 256. In such a condition, a heated tool (not shown) acts on the forward end portions of the projections 242 and 244 to thermally deform the projections 242 and 244. As shown in the drawings, the opening portions of the pin holes 258 and 260 are tapered, and it is preferred that the thermally deformed projections 242 and 244 should be partly engaged with the tapered portions. By thermally deforming the projections 242 and 244, the connector means 206 can be fixed to the base main body 202 relatively simply and surely.

In this specific example, the securing hole 253 may be sealed by a sealing member 262. The sealing member 262 can be constructed of a synthetic resin sheet, and covers the securing hole 253 and the connector means 206 mounted thereon. Furthermore, this sealing member 262, as shwon in FIG. 11, covers a greater portion of the lead portion 246 which extends from the stator core 218 to the connector means 206. Accordingly, the securing hole 253 is sealed up by the sealing member 262, and the rising of the lead portion 246 is surely prevented. In the same way as in the first specific embodiment, an accommodating groove for accommodating the lead portion 246 may be provided.

Figure 13:
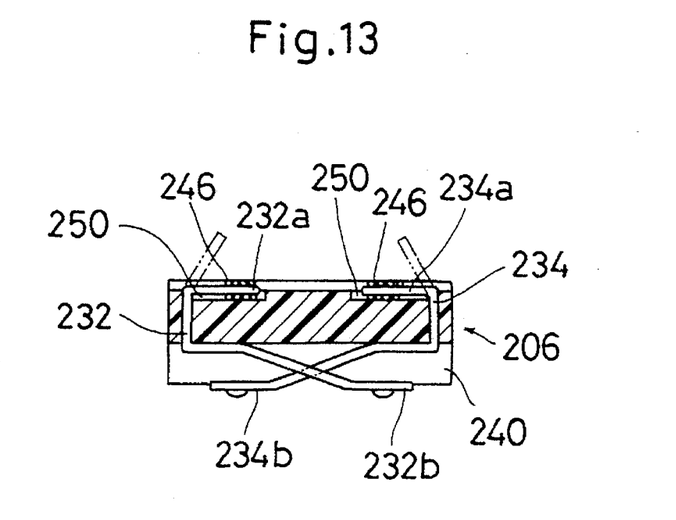
FIG. 13 is a sectional view along line XIII—XIII in FIG. 12.
Figure 14:
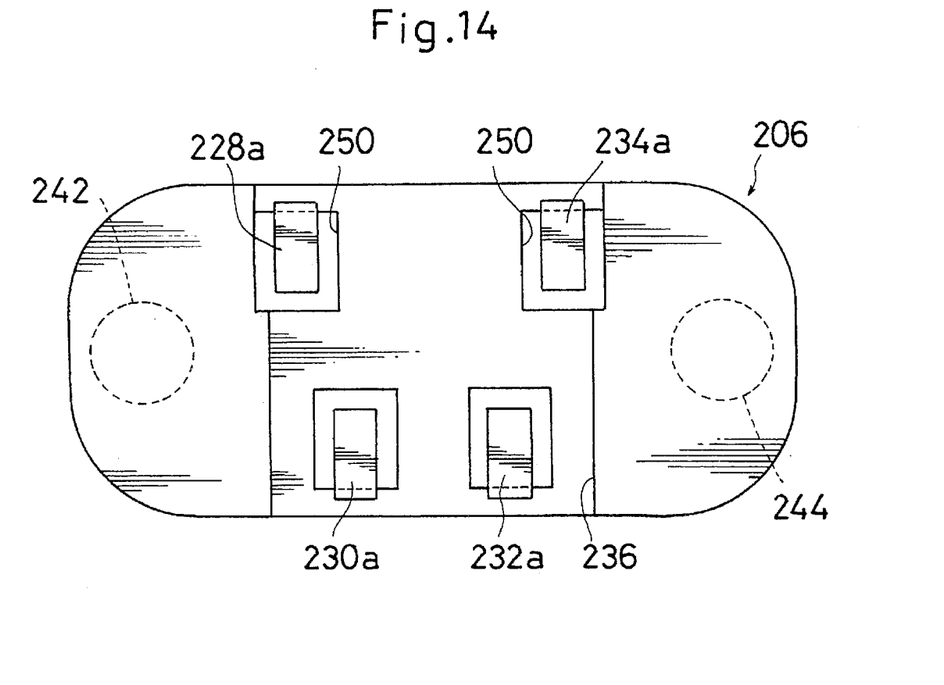
FIG. 14 is a top plan view of connector means of the spindle motor of FIG. 10.
Figure 15:
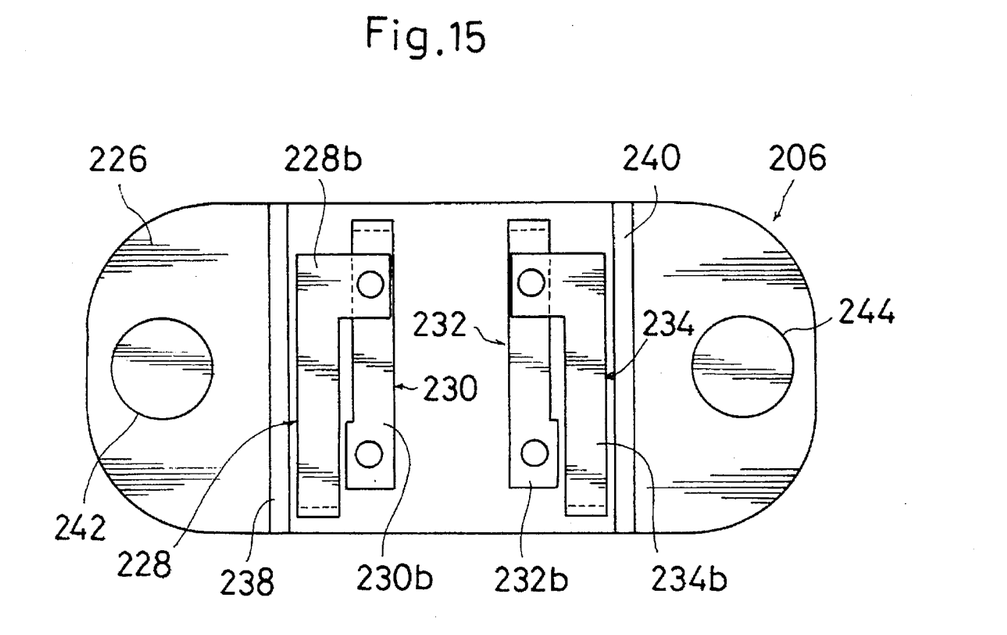
FIG. 15 is a bottom view showing the connector means of FIG. 14.

Underneath the bottom wall 208 of the base main body 202, a circuit substrate board of a disk driving apparatus may be provided although it is not shown in the drawings. Terminal portions are provided in the circuit substrate board. On the other hand, the other end portions 228a, 230a, 232a and 234a of the terminal portions 228, 230, 232 and 234 in the connector means 206, as shown in FIGS. 13 and 15, are constructed in the form of a flat spring, and a terminal projection is provided in its forward end portion. In the specific embodiment, the other end portions 228b and 234b of the terminal portions 228 and 230 located outwardly extend in FIG. 15 from downwardly to upwardly in a direction in which they separate from the connector main body 226, and on the other hand, the other end portions 230b and 232b of the terminal portions 230 and 232 located inwardly extend in FIG. 15 from upwardly to downwardly in a direction in which they separate from the connector main body 226.

Other constructions of the spindle motor of the second embodiment are substantially the same as the first embodiment, and their details will be omitted. Winding of the coil 222 on the stator core 218 may be carried out by making a change so that the structure of the clamp means may hold the connector means 206.

The specific examples of the spindle motor and the winding apparatus in accordance with this invention have been described above. However, the present invention should not be limited to these specific examples, and various changes and modifications will be possible without departing from the scope of the invention described and claimed hereinabove.

What is claimed is:

1. A spindle motor comprising;

a base member having a stator supporting portion;

a connector receiving hole and a plurality of grooves;

a stator having a core supported on said stator supporting portion and coils wound around winding portions of said stator core;

a connector member having a plurality of terminal portions and received in said connector receiving hole of said base member; and lead wires extending form said coils to said plurality of terminal portions of said connector member and electrically connected thereto;

said lead wires being accommodated respectively within corresponding grooves of said base member.

2. A spindle motor according to claim 1 wherein, the number of said grooves corresponds to the number of said lead wires of said coils and said grooves guide said lead wires of said coils from said stator core to said plurality of terminal portions.

3. A spindle motor according to claim 1, further comprising a sealing member for covering said accommodating grooves and connector member to seal them within said base member.

4. A spindle motor according to claim 1, wherein said connector member includes at least one recessed portion within which said terminal portions of said connector member are disposed.

5. A spindle motor comprising:

a base member including a stator supporting portion and a connector receiving hole;

a stator including a core having teeth supported on said stator supporting portion with coils wound around the core teeth;

a connector member including a terminal carrying member received in said connector receiving hole and having upper and lower recesses which oppose each other, a plurality of leaf-shaped terminal members extending through said terminal carrying member accommodated within said upper and lower recesses with projecting portions folded; and lead wires extending from said coils to said plurality of terminal members in said upper recess and electrically connected thereto.

6. A spindle motor according to claim 5, wherein the number of said terminal members is four and two of them are arranged substantially adjacent and inwardly within the recesses while the other two are spaced substantially from each other and from the inwardly arranged members and arranged outwardly within the recess, and wherein the projecting portions of the terminal members are folded within the lower recess and arranged in such a manner that the portion of said outwardly arranged terminal members respectively cross the portions of the inwardly arranged terminal members.

7. A spindle motor according to claim 6 wherein said terminal members are made of electrically conductive elastic material.

* * * * *